United States Patent [19]

Milton

[11] Patent Number: 4,863,783

[45] Date of Patent: Sep. 5, 1989

[54] SECURITY PAPER

[75] Inventor: Neil A. Milton, Ivybridge, England

[73] Assignee: The Wiggins Teape Group Limited, Basingstoke, England

[21] Appl. No.: 938,439

[22] Filed: Dec. 5, 1986

[30] Foreign Application Priority Data

Dec. 5, 1985 [GB] United Kingdom ................. 8529953
May 6, 1986 [GB] United Kingdom ................. 8610993

[51] Int. Cl.[4] .......................... B32B 3/00; B32B 7/00; D21H 3/80

[52] U.S. Cl. .................................... 428/207; 162/140; 162/162; 428/206; 428/211; 428/537.7; 428/916

[58] Field of Search ............... 428/916, 195, 206, 207, 428/211, 537.7; 162/140, 162

[56] References Cited

U.S. PATENT DOCUMENTS

| | | | |
|---|---|---|---|
| 3,128,222 | 4/1964 | Herschler et al. | 162/162 |
| 3,201,352 | 8/1965 | Jayme et al. | 162/162 X |
| 3,258,392 | 6/1966 | Brill et al. | 162/162 |
| 3,429,825 | 2/1969 | Voedisch | 162/162 X |
| 3,876,496 | 4/1975 | Lozano | 162/162 X |
| 3,880,706 | 4/1975 | Williams | 162/140 |
| 4,136,229 | 1/1979 | Godet et al. | 428/916 |
| 4,166,644 | 9/1979 | Kay et al. | 428/325 X |
| 4,198,268 | 4/1980 | Frei et al. | 162/162 |

FOREIGN PATENT DOCUMENTS

| | | | |
|---|---|---|---|
| 0219743 | 4/1987 | European Pat. Off. . | |
| 2478695 | 9/1981 | France . | |
| 1435686 | 5/1976 | United Kingdom | 428/916 |
| 1528193 | 10/1978 | United Kingdom . | |
| 2122545 | 1/1984 | United Kingdom | 428/916 |

*Primary Examiner*—Lorraine T. Kendell
*Attorney, Agent, or Firm*—Burns, Doane, Swecker & Mathis

[57] ABSTRACT

Paper embodying for purposes of identification one or more pigments, inconspicuous in daylight but visible on inspection in darkened surroundings or after illumination at predetermined wavelength from an artificial source, wherein the pigment is in the form of granules which are of 30 to 500 microns particle size and, to secure contrast between the pigment and background in said inspection, are essentially free of finer particles.

8 Claims, No Drawings

SECURITY PAPER

The invention relates to identified paper for security and other purposes.

In many applications paper is required to be identifiable as to source or authenticity as well as in security applications, difficult to counterfeit. Desirably also, attempts to falsify documents should irreversibly change the paper.

One approach has been that of Aussedat Rey S. A. in their French patent application No. 80 06336 (2 478 695) in which luminescent particles are dispersed in the paper, showing up in ultraviolet light. Combinations of pigments can be used, as mixed agglomerates or added separately, and pigments sensitive to falsification procedures can be chosen. There are however problems in insufficiently controlled incorporation in the paper, losses on the machine, and obtrusiveness in ordinary use of the paper, as well as a wide variation in particle size.

We have studied the above approach and found that a key aspect is the particle size. Particles should neither be so large that they are distracting in the use of the paper, nor so small as not to be identifiable by eye when the paper is checked. Particles that are too small merge into a general background and thus lose their identifying characteristics. Further, we have recognised that not only the predominant particle size but an absence of background from small particles, not individually appreciable, is important if the quick checking of papers for source or authenticity that is necessary in practical use is to be achieved.

The invention accordingly provides paper embodying for purposes of identification one or more pigments, inconspicuous in daylight but visible on inspection in darkened surroundings or after illumination at predetermined wavelength from an artificial source, wherein the pigment is in the form of granules which are of 30 to 500 microns, preferably 100 to 230 or 250 microns particle size and, to secure contrast between the pigment and background on said inspection, are essentially free of finer particles.

It is impracticable to quantify the limit for fine particles, but by careful production of the granules in the first place and by subsequent sieving they can be reduced to a small proportion, certainly under 5% where the small particles of commercially available pigment are concerned and likely under 1% by weight. The test is whether on inspection of the final paper there is contrast between a visually unreactive background and the granules. A paper according to the invention, using fluorescent particles, can for example be viewed under ordinary room lighting by passing a U.V. lamp across it, when distinctive individual spots of light flash up against a background that, relative to them, is dark. Under similar conditions a prior art product made without control of the granule size shows a diffuse and generalised reaction, uncontrolled and indistinct, against a background of light from individually indistinguishable particles.

The granules may for example be formed of a resin containing a light-reacting dye or of pre-formed light-reacting particles resin bonded, allowing close and predetermined control of the particle size. Such preformed pigment particles are conveniently themselves of a resin containing a light reacting dye, but there is no restriction to these and for example pigment materials light reactive per se, such as phosphorescent zinc sulphide particles, may be bonded.

An important subsidiary feature of the invention lies in a practical and convenient method of making the granules from commercially available pigments, which are supplied in very finely divided form. Thus suitably the granules are formed by adding a quantity of a liquid resin binder to the particles and tumbling until aggregates constituting the granules have been formed, said quantity of binder being sufficient to aggregate the particles but not to form a continuous liquid phase.

In an important further embodiment, allowing far more particular charcterisation of a paper, for example as to period as well as source of manufacture, the preformed particles are themselves of smaller particles, preferably aggregated by a process as above.

Desirably for security applications the granules are dispersed in the substance of the paper following incorporation in a paper-making stock, particularly immediately prior to the headbox. However, where identification rather than security as such is the important aspect, it is convenient if the granules are present as a coating or as separated indicia, applied to the paper. Such indicia can be very economical of the pigments, a carbonless copy paper set for example needing only to carry, essentially only on one sheet of the set, sufficiently frequent indicia that one or more will appear on each such sheet.

Thus the granules may be in various forms, e.g. aggregates of commercially available luminescent pigments used singly or to make mixed granules, or resins containing luminescent dye ground to form the granules, of granules of zinc or other phosphorescent compounds. It is also possible to use a combination of a resin, containing luminescent dye, acting as a binder for other pigments either in an aggregation process or in a direct process of formation of a block and grinding to size. The resin, or resin-bonded, granules are particularly suited to being incorporated in paper stock as they are not susceptible to size reduction in the paper-making process, particularly physical breakup in the refiners of the stock preparation system.

The luminescent material may be either fluorescent of phosphorescent. For example paper produced may be intended to be observed under U.V. light, particularly with the convenient battery operated low power U.V. sources now available for hand-held use, the particles fluorescing in one or more colours. Each individual particle may show a single colour or a composite of two or more different colours. Paper may alternatively or in addition contain phosphorescent particles luminescing under the influence of daylight, and if such paper is observed in a darkened room, or a dark box, the granules will continue to glow.

In the aspect of the invention where resin-dissolved fluorescent dyes are used, suitable dyes and resins are known in themselves, available for example from Swada (London) Ltd., Sugar House Lane, London E.15 in their "Fiesta" (Trade Mark) pigment range. The fluorescence of organic dyes is associated with the individual molecules of the dyes, and in order for them to fluoresce efficiently, they are molecularly dissolved in fairly low concentrations, for example from about 1 to 4%. As the dyes are organic in nature it is necessary to have an organic medium to take them into solution, and in order to have a pigment it is essential for medium to be solid. One type of material that meets these requirements is a melamine formaldehyde resin modified with sufficient aromatic sulphonamide to form a brittle thermoplastic or thermoset product which can be ground to the required particle size. Various red and orange shades are available with yellow, blue and green also.

The aggregation process described above was developed primarily because commercial luminescent pigments are generally available only in standard particle sizes of perhaps 3 to 5 microns. The agglomeration process generates particles of the larger size suited to the present use. However, luminescent pigments such as the "Fiesta" range are in fact solutions of luminescent dyes in a base resin, and are made from block form by grinding. Where a single pigment is sufficient it can be made direct in the required size.

The question whether or not a mixed aggregate is necessary depends partly on uniqueness of identification, but also on the apparent colour of the particle required. In cases where the required particle colour is that of one of the available luminescent dyes, one can simply use a particle of the right size ground from a block using such a dye. However, mixed apparent shades, for example greens not directly available, can be given by mixed aggregation of fine blue and yellow particles.

The invention thus conveniently uses:

- two or more luminescers, for ready exclusive identification
- aggregates readily incorporated in papermaking and not degrading in size
- particles convenient for observation by reason of their size In a further aspect the invention provides a process of making pigment agglomerates, and the agglomerates produced, wherein pigments as above are coated in reactive binder and formed directly or indirectly into the agglomerates. Preferably the coating is achieved by tumbling of pigment and binder and the tumbling continued until the desired agglomerates have formed. It is particularly advantageous to form sub-agglomerates of individual pigments in this way, and then combine them into composite agglomerates. Highly characteristic paper can then be made, with the individual pigments in the agglomerates readily identified.

The tumbling is an essentially solid phase process operated with only sufficient liquid binder to coat the particles, but the use of a carrier solvent for the resin or other binder is not excluded. The agglomeration process can be closely controlled and the product graded, any undersize agglomerates being returned direct to the agglomeration process and any oversize product ground and likewise returned.

It will be appreciated that binder coating of the pigment may be achieved by other techniques. For example as referred to earlier herein, the pigment may be disposed in reactive binder and the binder cured to form a block subsequently ground to form the agglomerates. Composite agglomerates if required are then made from separately made sub-agglomerates by a further agglomeration step.

In a particular process, pigment particles of 3–5 μM (micron) or other convenient particle size, are coated with a binder resin containing a cross linking catalyst, such as ammonium chloride. The binder can for example be a melamine formaldehyde or acrylic resin. The particles are agglomerated by granulation in the solid phase as described above, to produce larger granules or agglomerates, and the binder is cured naturally or with heating, for example at 105° C. The cured granules are sieved to exclude granules outside the desired particle size range and the sieved granules added to the paper machine prior to forming the web, e.g. in the pulper, chest or approach flow. Alternatively, sub-granules may be prepared from separate pigments, regranulated, and sieved to produce composite granules of two or more colors.

Granules produced in the solid phase, by this granulation technique, comprise the 3–5 micron pigment particles chemically bound together by a fully cross linked binder. Prior agglomerates such as those of Aussedat Rey S. A. are formed in the liquid phase and, although a binder is present, this binder is not cross linked until the paper is dried on the paper machine. Such granules are physcially, rather than chemically, agglomerated and it is impossible to control their production to a regular distribution or to obtain in one paper different composite granules of two or more colours.

As to the stage of incorporation in the paper, success has been achieved by addition of the granules to the thickstock contained in the chest of the paper machine prior to refining; to the refined thickstock in the second chest of the paper machine; and by addition to the size press. However, it has been found to be most beneficial to add the granules to the thinstock immediately prior to the headbox to obtain the most desirable visual effect.

Particular examples of the use of the invention are as follows:

EXAMPLE 1

"Radglo" (Trade Mark) pigments were used, obtained from Ciba-Geigy and made by Radiant Colour N.V. Europarklaan B 3530 Houthalen, Holland. They comprised an aldehyde-sulfonomide-triazine polycondensation resin with fluorescent dyestuffs, known per se.

1 kg of each pigment powder, comprising particles in the range 3 to 5 μM diameter, was mixed in a stainless steel drum, rotating at 84 rpm and inclined at 30 degrees to the horizontal. An agitator positioned in the drum was rotated at 5000 rpm in the opposite direction to the rotating drum.

180 ml of an aqueous acrylic emulsion, "Acronal" (Trade Mark) S 360 D, at 25% resin solids containing 0.5% ammonium chloride catalyst weight on resin solids was used. It was a styrene acrylonitrile and acrylic ester copolymer dispersion obtained from BASF (U.K.) Ltd., P.O. Box 4, Earl Road, Cheadlehume, Cheshire. An alternative catalyst is p-toluene sulphonic acid. The emulsion was slowly added to the fluorescent pigment powder which formed granules that increased in size as the emulsion was added. The process was stopped before excessively large granules were formed.

It was noted that in this instance the temperature of the rotating drum had risen from ambient temperature to 30° C. as the granulating process continued. It has however been found that the precise quantity of binder required differs from one batch to the next, depending partly on the skill of the operator but also on the speed of addition, the temperature of the binder, the solids content and the chemical nature of the binder. For example, in a separate run it was found that 125 ml of a 35% solids solution of "Beetle BC 355" (Trade Mark) non-ionic methylated melamine formaldehyde resin binder, at 50° C., was sufficient. It was obtained from British Industrial Plastics, P.O. Box 6, Pope's Lane, Oldbury, Warley, West Midlands.

The granules were removed from the drum and dried in an oven at 105° C. (natural curing or microwave oven heating are alternatives) for 1 hour to cross link the binder, and the size of the granules produced by the process was found to be very suitable at the high drum and agitator rotational speeds used.

The dried granules were sieved to remove granules smaller than 106 μM and larger than 230 μM. The small granules were regranulated and the large granules likewise retained for grinding, sieving and regranulation.

White (blue fluorescence), yellow, orange and red granules were produced by the granulation process. The granules were mixed in the ratio of 4:3:2:2, by volume, and dispersed in water at a concentration of 1% by weight. The dispersion of granules was pumped into the thinstock of a paper machine immediately prior to the headbox at the rate of 4 Kg granules/tonne paper (0.4 g/m$^2$ on a paper of substance 100 g/m$^2$).

When the paper produced by the addition of the granules was observed under ultra-violet light it was found to contain well distributed, easily observed distinct spots which fluoresced blue, yellow, orange and red.

EXAMPLE II

Two pigments corresponding to 3–5 μM particle size pigments from the "Fiesta" range as referred to earlier herein, namely "Fire Orange A 4" and "Corona Magenta A 10", were prepared by dissolving the dyes (2% by weight) in a standard aromatic sulphonamide-modified melamine formaldehyde resin as used for such pigments, curing in block form and grinding direct to 106–230 μM. Used in making of paper as in Example I these gave a security product with orange and red spots visible with care to the eye in daylight and orange and magenta fluoresence under wide-band U.V. light.

EXAMPLE III 500 g of per se conventional fluorescent yellow pigment at 3–5 μM particle size from the "Fiesta" range was mixed in a rotating drum as in Example I. 150 ml of a polyvinyl acetate emulsion at 50% solids, "Vinamul" R82020 (Trade Mark) was slowly added to the fluorescent pigment powder. It was a polyvinyl alcohol stabilised self cross linking polyvinyl alcohol emulsion obtained from Vinamul Ltd. at Mill Lane, Carshalton, Surrey. The process was stopped before the granules became excessively large. The granules were removed from the drum and allowed to dry at ambient temperature.

The granules were sieved to remove particles smaller than 106 μM and larger than 230 μM.

Laboratory handsheets containing the granules were produced and were found to contain distinct spots which fluoresced yellow when observed under ultraviolet light.

EXAMPLE IV

Phosphorescent pigment 163G, a known zinc sulphide:copper activated pigment obtained from Derby Luminescents at Mill Marsh Lane, Brinsdown, Enfield, Middlesex was used, 25 g of the pigment being weighed into a laboratory beaker. 5 g of a polyvinyl acetate emulsion, Vinamul R82020 (Trade Mark), at 50% solids, was slowly added to the pigment and stirred vigorously with a glass rod to form granules.

The granules were removed from the beaker and allowed to dry at ambient temperature.

The dried granules were sieved to remove granules smaller than 106 μM and larger than 230 μM.

Laboratory handsheets were produced containing the granules within the particle size range of 106 μM to 230 μM. When the paper, previously in daylight, was observed in a dark room it was found to contain well distributed easily observed distinct green spots. It was found that the brightness of the spots could be increased by prior exposure to ultra-violet light. The brightness of the spots was found to diminish with time if the paper was retained in the dark room without further exposure to ultra-violet or visible light.

EXAMPLE V

Using a laboratory coater, sheets of A4 size white paper of the kind used as a base paper in the manufacture of 'IDEM' (Registered Trade Mark) carbonless copying paper were coated on one side with 5 grams per square meter of a standard mix of microcapsules, starch particles and carboxymethylcellulose binder as used in such copying paper and in which had been dispersed 0.1% by weight of a fluorescent granule mix as described in Example I. The other side of each sheet was similarly coated with 8 grams per square meter of a standard dispersion of acid washed montmorillonite clay (sold under the trade name 'Silton') and kaolin and to which 0.1% by weight of the same fluorescent granule mix had been added.

When the dried paper was observed under ultra-violet light, well distributed easily observed distinct spots were observed on both sides of the paper which fluoresced blue, yellow, orange and red and exhibited a good contrast against the background.

EXAMPLE VI

Using a laboratory coater, sheets of A4 size white paper of the kind used as a base paper in the manufacture of 'IDEM' (Registered Trade Mark) carbonless copying paper were coated on one side with 8 grams per square meter of the following formulation:

| | Grams |
|---|---|
| Water | 27.1 |
| Potassium hydroxide (50%) | 0.6 |
| Sodium hydroxide (30%) | 1.3 |
| Kaolin (sold under the trade name 'Dinkie A') | 7.9 |
| Acid washed montmorillonite clay (sold under the trade name 'Silton') | 19.2 |
| Styrene butadiene latex binder (sold under the trade name 'Dow 620') | 10.4 |
| Fluorescent pigment granule mixture manufactured as described in Example I | 0.1 |

The other side of the paper was coated with 5 grams per square meter of a standard mix of microcapsules, starch particles and carboxymethylcellulose as used in Example V.

When the dried paper was observed under ultra-violet light, well distributed easily observed distinct spots were observed on both sides of the paper which fluoresced blue, yellow, orange and red and exhibited a good contrast against the background.

EXAMPLE VII

A mix was prepared according to the following formulation:

| | Grams |
|---|---|
| Water | 27.3 |
| Kaolin (sold under the trade name 'Dinkie A' | 26.8 |
| Styrene butadiene latex binder (sold under the trade name 'Dow 620') | 10.8 |
| Fluorescent pigment granule mixture manufactured as described in Example I | 0.1 |

Using a brush, a strip about 1 centimeter wide on each side of sheets of A4 size white paper of the kind used in Example V was coated with the formulation. The paper was allowed to dry. Coating formulations of the kind specified in Example VI were then prepared, except that the fluorescent pigment components were omitted. The formulations were then applied to opposite sides of the paper sheet using the same coatweights as in Example V and dried. When observed under ultra-violet light, well distributed, easily observed distinct spots were observed on both sides of the paper in the zones where the brush coated strips had been applied which fluoresced blue, yellow, orange and red and exhibited a good contrast against the background.

I claim:

1. Paper embodying for purposes of identification granules comprising 3 to 5 micron pigment particles chemically bound together by a cross-link binder, inconspicuous in daylight but visible on inspection in darkened surroundings or after illumination at predetermined wavelength from an artificial source, wherein the granules are of 30 to 500 microns particle size and, to secure contrast between the pigment and background in said inspection, said granules are essentially free of finer particles.

2. Paper according to claim 1, wherein said particle size of said granules is 100 to 250 microns.

3. Paper according to claim 1, wherein the granules have been formed by adding a quantity of a liquid resin binder to the particles and tumbling until aggregates constituting the granules have been formed, said quantity of binder being sufficient to aggregate the particles but not to form a continuous liquid phase.

4. Paper according to claim 3, wherein the preformed particles are themselves aggregates formed by a like tumbling process.

5. Paper according to claim 1, wherein the granules are dispersed in the substance of the paper following incorporation in a paper-making stock.

6. Paper according to claim 1, wherein the granules are present as a coating applied to the paper.

7. Paper according to claim 1, wherein the granules are formed of performed light-reacting particles resin bonded.

8. Paper according to claim 1, wherein the granules are present as separated indicia applied to the paper.

* * * * *